United States Patent
Hixson et al.

(10) Patent No.: US 11,949,727 B2
(45) Date of Patent: Apr. 2, 2024

(54) ORGANIC CONVERSATIONS IN A VIRTUAL GROUP SETTING

(71) Applicant: Lenovo (United States) Inc., Morrisville, NC (US)

(72) Inventors: Dane Hixson, Eden, UT (US); Matthew Fardig, Boonville, IN (US); Faisal Mohamed, Mebane, NC (US); Peter Koeppen, Fort Wayne, IN (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 17/704,114

(22) Filed: Mar. 25, 2022

(65) Prior Publication Data

US 2023/0308501 A1    Sep. 28, 2023

(51) Int. Cl.
| | | |
|---|---|---|
| H04M 3/56 | (2006.01) | |
| G06F 3/01 | (2006.01) | |
| G06T 3/40 | (2006.01) | |
| G06T 5/00 | (2006.01) | |
| G06T 5/50 | (2006.01) | |
| H04L 65/613 | (2022.01) | |
| H04L 65/80 | (2022.01) | |
| H04L 9/08 | (2006.01) | |

(52) U.S. Cl.
CPC .............. *H04L 65/80* (2013.01); *G06F 3/013* (2013.01); *G06T 3/40* (2013.01); *G06T 5/002* (2013.01); *G06T 5/50* (2013.01); *H04L 65/613* (2022.05); *H04M 3/568* (2013.01); *H04L 9/0833* (2013.01); *H04M 2201/40* (2013.01)

(58) Field of Classification Search
CPC ....... H04L 65/80; H04L 65/613; G06F 3/013; G06T 3/40; G06T 5/002; G06T 5/50; H04M 3/568; H04M 2201/40
USPC ........................................................ 348/204
See application file for complete search history.

(56) References Cited

U.S. PATENT DOCUMENTS

| | | | | |
|---|---|---|---|---|
| 11,412,278 | B1* | 8/2022 | Robinson | H04N 21/2743 |
| 2021/0399911 | A1* | 12/2021 | Jorasch | H04L 12/1822 |
| 2022/0247919 | A1* | 8/2022 | O'Leary | H04N 5/2628 |
| 2022/0408059 | A1* | 12/2022 | Stonehocker | H04N 7/147 |
| 2023/0021608 | A1* | 1/2023 | Clark | H04N 21/439 |
| 2023/0038109 | A1* | 2/2023 | Braganza | G10L 25/51 |
| 2023/0135312 | A1* | 5/2023 | Decrop | G06V 10/40 |
| | | | | 348/14.08 |
| 2023/0230085 | A1* | 7/2023 | Turgeman | G06Q 20/40145 |
| | | | | 705/44 |

FOREIGN PATENT DOCUMENTS

CN     114064943 A   *   2/2022

OTHER PUBLICATIONS

"Create Space", Wonder Home Page, © 2021 Wonder [online]. Retrieved from the Internet: <URL: https://www.wonder.me/>, (2021), 9 pgs.

* cited by examiner

*Primary Examiner* — John W Miller
*Assistant Examiner* — Omer Khalid
(74) *Attorney, Agent, or Firm* — Schwegman Lundberg & Woessner, P.A.

(57) ABSTRACT

A video conferencing system includes data relating to the focus of attention of an attendee in a virtual conference. The system determines the focus of attention of attendee as a function of the data and modifies an audio output and/or a video output of the system as a function of the focus of attention of the attendee.

19 Claims, 5 Drawing Sheets

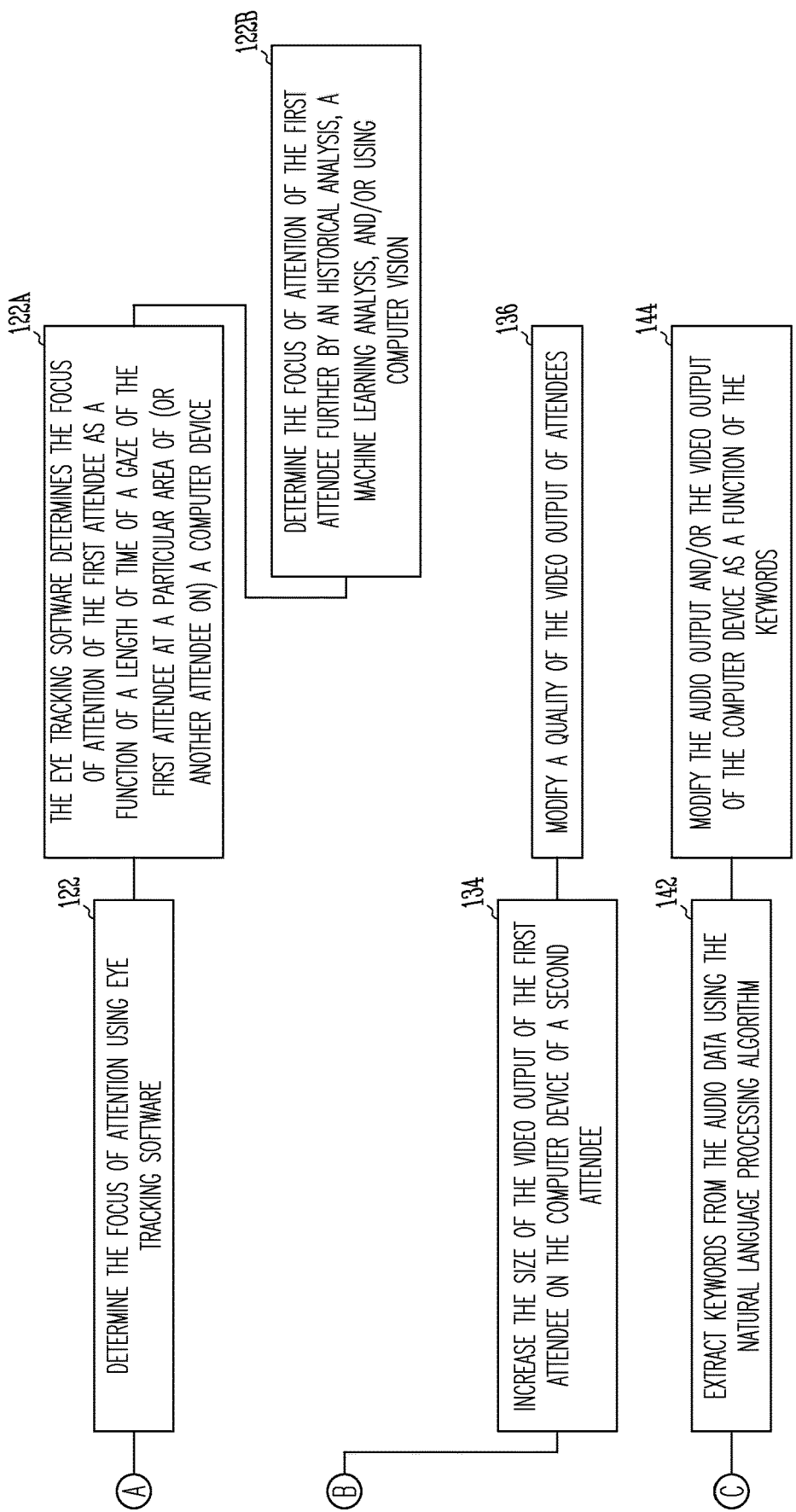

ORGANIC CONVERSATIONS IN A VIRTUAL GROUP SETTING

TECHNICAL FIELD

Embodiments described herein generally relate to organic conversations in a virtual group setting, and in an embodiment, but not by way of limitation, altering the video output and audio output of a video conference based on the focus of one or more a conference attendees.

BACKGROUND

In an in-person group setting, several conversations can be occurring at once. People's brains permit them to distinguish between the different conversations by directing their attention to where the conversation is occurring. This can either be by looking in that direction and focusing on the person(s) speaking, or physically stepping into small conversation groups. However, in a virtual setting, this is difficult as only one person can speak at a time if that person wants to be understood clearly.

A prior attempt to address this difficulty of multiple conversations in a virtual setting utilizes user interface (UI) space to enhance the audio in a special setting. However, this prior approach is not quite organic because an attendee must navigate the soundscape with a mouse, rather than focusing attention on with whom they want to communicate. Other solutions include manually starting a breakout room to separate people into a group. However, this again is not very natural and takes additional conference resources.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIGS. 1A and 1B are a diagram illustrating operations and features of a system to modify the video output and/or audio output of a video conference.

DETAILED DESCRIPTION

Figure 1A:
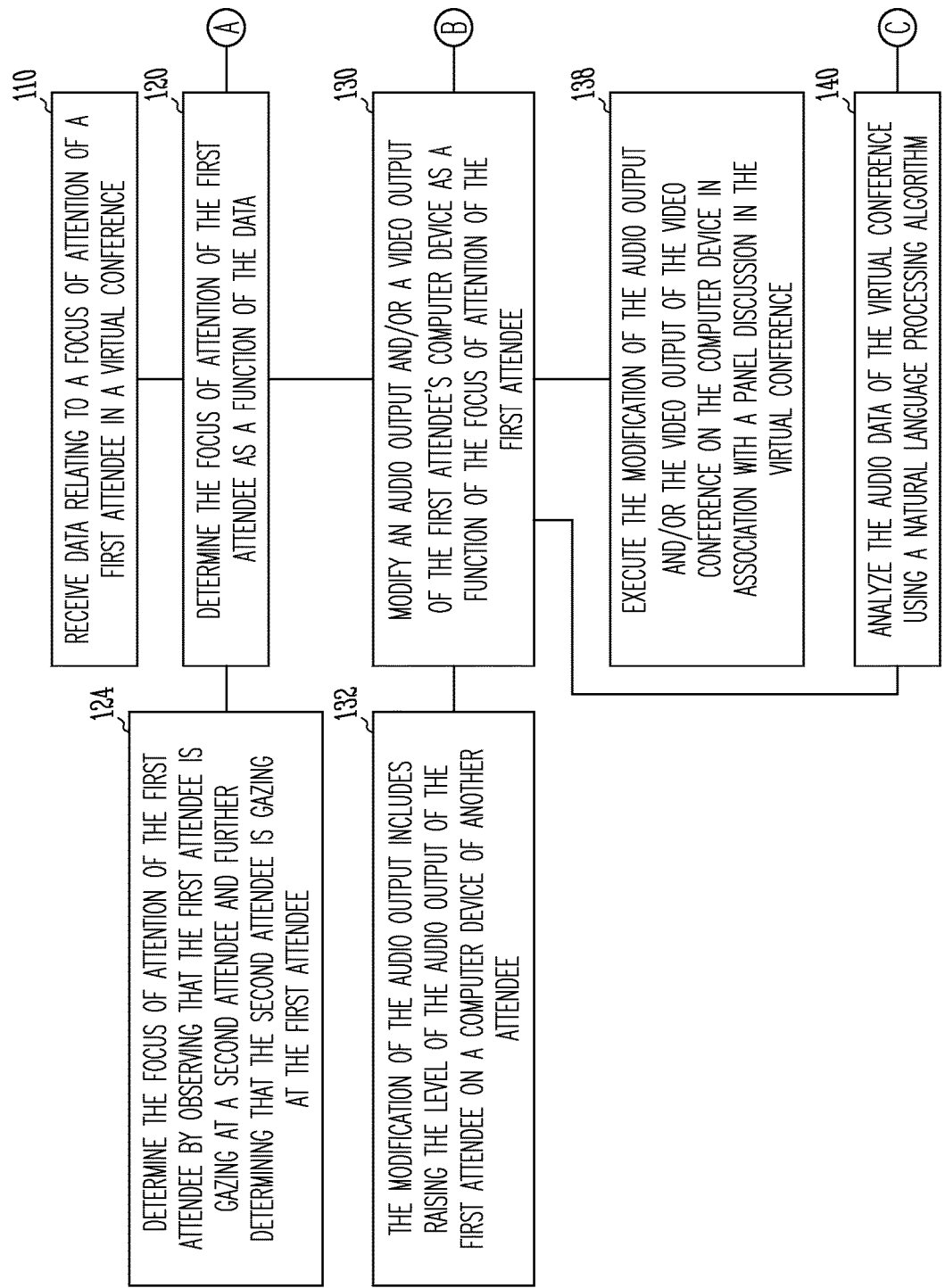

One or more of the embodiments disclosed herein provide a way for organic conversations to take place in a virtual setting. An embodiment accomplishes this by detecting the attention of meeting attendees and modifying the audio and video output of the display of the meeting on one or more computer devices based on the focus of the attendee's attention.

For detecting the attention of a virtual meeting attendee, an embodiment utilizes technologies and techniques to determine where an attendee's attention is focused. Some of these technologies and techniques include, but are not limited to, eye tracking software. Such software can determine on what or whom a meeting attendee is focused. For example, longer gazes can be used to determine when an attendee is focused on another attendee and wants to engage and converse with that other attendee. Also, if two attendees are looking at each other, this helps determine that they would like to engage and converse with each other.

In addition to the use of eye tracking software, an embodiment can use historical analysis and/or machine learning to determine which specific attendees tend to speak to other specific attendees. Specifically, in situations where gaze alone is not enough to determine if two attendees would like to talk, an historical analysis can be used to determine to which attendee a user tends to engage and converse. Additionally, machine learning can be used to determine situations in which an attendee tends to talk to another given attendee. For example, right after sales meetings, it may be determined that a first attendee always engages in conversation with a second attendee. As another example, in a team meeting, it may be determined that when a question is asked followed by silence, the moderator tends to ask the team leader to jump in with an answer.

In an embodiment, organic audio and video output can utilize sound mixing technologies as well as user interface (UI) elements to separate audio and video from other conversations happening at the same time. Some examples include, but are not limited to, raising the volume to one attendee or a group of attendees to show another attendee's intent to speak to them, raising the volume coming from one attendee or a group of attendees when attention on them has been detected, increasing the size of one attendee or a group of attendees to show on whom an attendee's attention is focusing, and pausing or reducing video quality when an attendee's focus is not on other certain attendees.

Embodiments of the present disclosure can be put to many uses and have many advantages. For example, an embodiment can be useful in connection with a panel discussion in an online video conference. In a traditional online conference, panel discussions are restricted by everyone having to listen to the current speaker. If three panelists are available to answer questions, only one person can ask a question at a time, and only one panelist can answer at a time. However, with an embodiment of the present disclosure, an attendee could ask a panelist a question and engage in conversation, and another attendee could choose to listen to that conversation or that other attendee could ask a question of another panelist. Consequently, this particular embodiment allows all panelists to engage in questions and/or answers at the same time, and it allows attendees to choose which discussions they would like to be a part.

Another use case allows conversations to be held between parties in an online video conference without any sort of direct, physical interaction. By utilizing an embodiment of the present disclosure, simple eye contact can be used to begin a conversation with one or more other attendees. Another use case allows a private audio channel to be opened between two attendees if eye contact is maintained long enough. This allows an attendee that is unable to manipulate a traditional mouse or other input device to control to whom they are talking in a video conference. It also provides the ability for a video conference attendee who is away from a computer input device to do the same (for example, a teacher standing at a whiteboard).

Also, one or more embodiments of the present disclosure save on bandwidth. For example, if there are fifteen attendees in a video conference, and each of the fifteen attendees is broadcasting with a camera, this video broadcasting consumes a lot of bandwidth for each attendee since that is a lot of video data being transferred. The embodiment detects that a first attendee and a second attendee are in a conversation. On the first attendees' computer, every video except the one from the second attendee is paused (so no bytes are received for those other videos). Similarly, on the second attendee's computer, every video except the one from the first attendee is paused (so no bytes are received for those other videos). This pausing only affects the feeds that the first attendee and the second attendee are receiving (no other attendees in the conference are affected by this). When the system determines that the first attendee and the second attendee are no longer in a conversation, then all other videos resume. In another embodiment, if the first attendee is detected to be in a conversation with the second attendee, then on the first attendee's computer, the second attendee's video plays. All videos from other attendees that are in close proximity on the screen to the second attendee's video remain running (possibly at a reduced framerate or lower resolution), while all other attendee videos not near the second attendee's video are paused. This feature mimics a real world human visual experience, wherein people who are close to a person can be seen (via peripheral vision) and heard more easily than persons who are farther away from the person.

FIGS. 1A and 1B are a block diagram illustrating features and operations for providing organic conversations in a video conference. FIGS. 1A and 1B include a number of feature and process blocks 110-144. Though arranged substantially serially in the example of FIGS. 1A and 1B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring specifically now to FIGS. 1A and 1B, at 110, data relating to a focus of attention of a first attendee in a virtual conference are received into a computer device.

At 120, the focus of attention of the first attendee is determined as a function of the data relating to the focus of attention of the first attendee. In an embodiment, the focus of attention is determined using eye tracking software (122). As indicated at 122A, the eye tracking software determines the focus of attention of the first attendee as a function of a length of time of a gaze of the first attendee at a particular area of (or another attendee on) the computer device. For example, if the virtual conference displays a plurality of squares on a display, and each of the squares is occupied by one or more conference attendees, the eye tracking software can determine which square the first attendee is gazing at, and consequently with which attendee the first attendee may want to engage in an organic conversation. The focus of attention of the first attendee can further be determined by an historical analysis, a machine learning analysis, and/or using computer vision (122B). As discussed above, an example of situation that can be inferred from an historical analysis and/or machine learning analysis is that after sales meetings, a first attendee seems to normally engage in a conversation with a particular second attendee. Computer vision, for example, can be used to determine the position and angle of an attendee's head, which can then be used to determine at which area of the computer device that the attendee is focusing.

In another embodiment, as indicated at 124, the focus of attention of the first attendee is determined by observing, via eye tracking software or other means (see operation 122), that the first attendee is gazing at a second attendee displayed on the computer device, and further determining that the second attendee is gazing at the first attendee displayed on a second computer device associated with the second attendee. That is, if the first attendee and the second attendee are looking at each other, that is an indication that both the first attendee and the second attendee would like to engage in an organic conversation.

Figure 2:
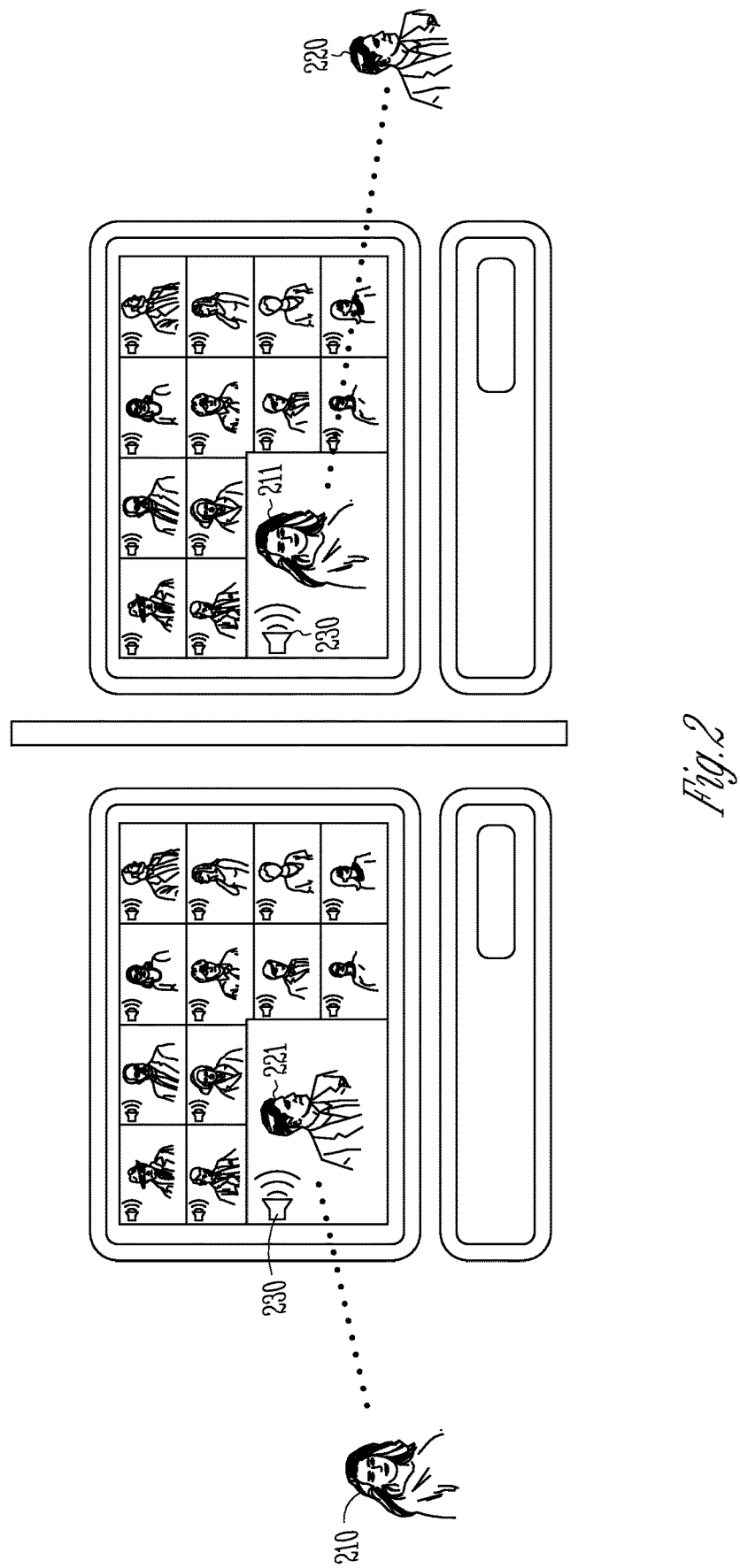
FIG. 2 is a diagram illustrating a modification of an output of a video conference based on the focus of an attendee.

At 130, an audio output and/or a video output of the first attendee's computer device is modified as a function of the focus of attention of the first attendee. The modification of the audio output can include raising the level of the audio output of the first attendee on a computer device of another attendee (132). The modification of the video output can take on several forms. As indicated at 134, the size of the video output of the first attendee can be increased on the computer device of a second attendee. This is illustrated in FIG. 2, wherein the image 211 of a first attendee 210 is increased in size, and the image 221 of a second attendee 220 is increased in size. These increases in size are the result of the determination that the focus of the first and second attendees were on each other, indicating that each wanted to engage with the other in an organic conversation. FIG. 2 further illustrates at 230 that the audio level of the organic conversation between the first attendee and the second attendee can be elevated.

Figure 3:
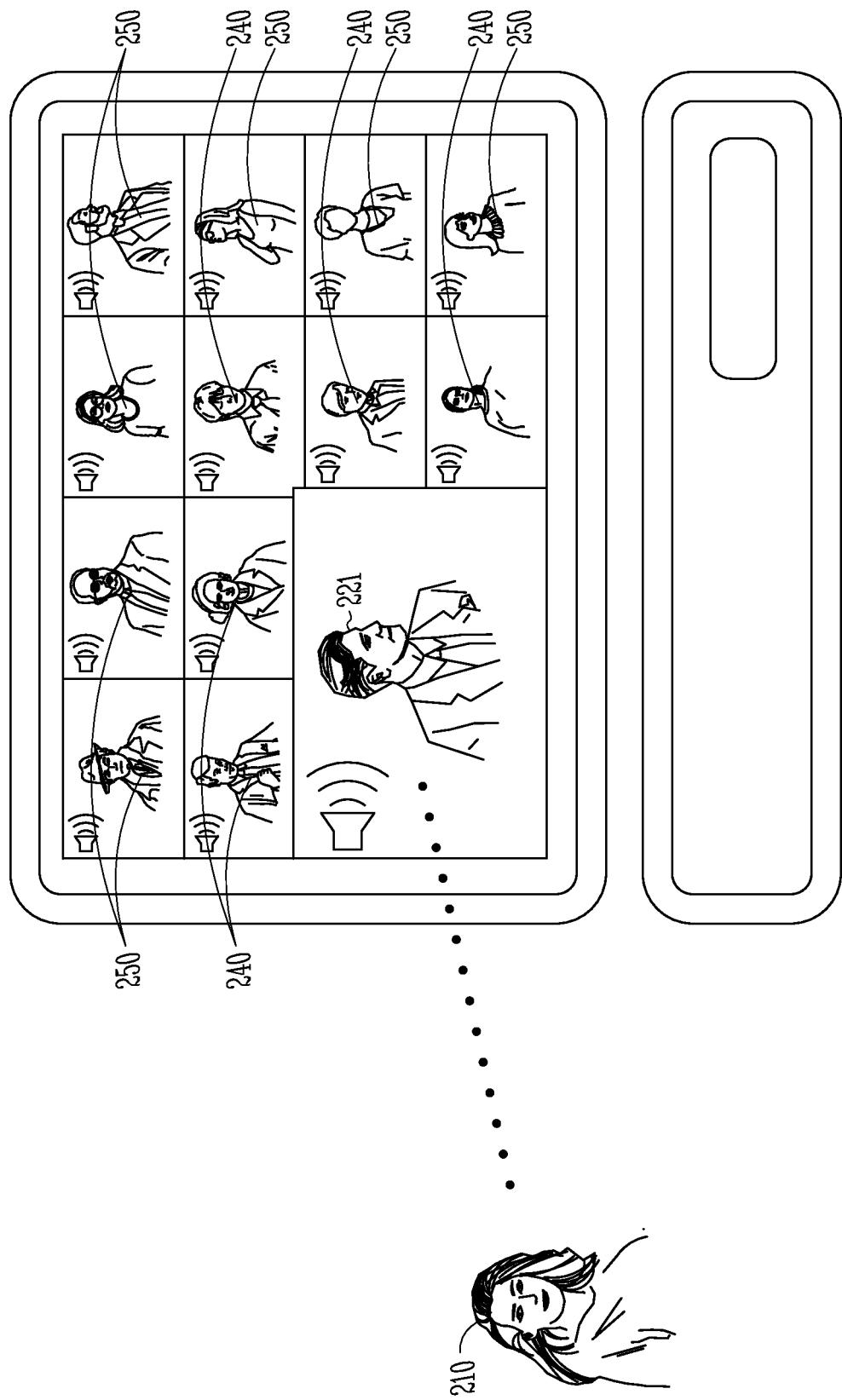
FIG. 3 is a diagram illustrating another modification of an output of a video conference based on the focus of an attendee.

As discussed above, the video output can further be modified by modifying a particular quality of the video output of attendees (136). An example of this further modification is illustrated in FIG. 3. In FIG. 3, the first attendee 210 is involved in an organic conversation with another attendee 220 (whose image 221 appears on the computer display device). The images of the other attendees 240 who are directly adjacent to the second attendee 220 are blurred. Additionally, the images of the other attendees 250 who are not directly adjacent to the second attendee 220 are paused. This blurring and pausing creates a more organic experience because in a live conversation between the first and second attendees, people who are more directly in their peripheral visions will be more noticeable by the first and second attendees, whereas people who are farther away from the first and second attendees will not be as noticeable or perceivable.

As discussed above and as indicated at 138, the modification of the audio output and/or the video output of the video conference on the computer device can be executed in association with a panel discussion in the virtual conference. For example, as noted above, an attendee of a panel-based video conference could ask a panelist a question and engage in conversation, and another attendee could choose to listen to that conversation or that other attendee could ask a question of another panelist. Consequently, an embodiment allows all panelists to engage in questions and/or answers at the same time, and it allows attendees to choose with which discussion they would like to be engaged.

In another embodiment, organic conversations can be instantiated based on the subject matter of such conversations. Specifically, the audio data of the virtual conference can be analyzed using a natural language processing algorithm (140). The natural language processing algorithm can extract keywords from the audio data (142). Then, the audio output and/or the video output of the computer device can be modified as a function of the keywords (144). For example, the natural language processing algorithm can determine that the term "snowboarding" is a keyword in a particular conversation (by the repeated use of the term in the conversation). That keyword can then be displayed on the computer device of an attendee (as if the attendee overheard the keyword), and if the attendee is interested in that subject matter, the attendee can then join that organic conversation. In another embodiment, a profile can be associated with an attendee, and in that profile are the interests of the attendee. If the identified keyword matches one or more of the attendee's interests in the profile, the attendee can be alerted that an organic conversation is taking place relating to that area of interest.

Figure 4:
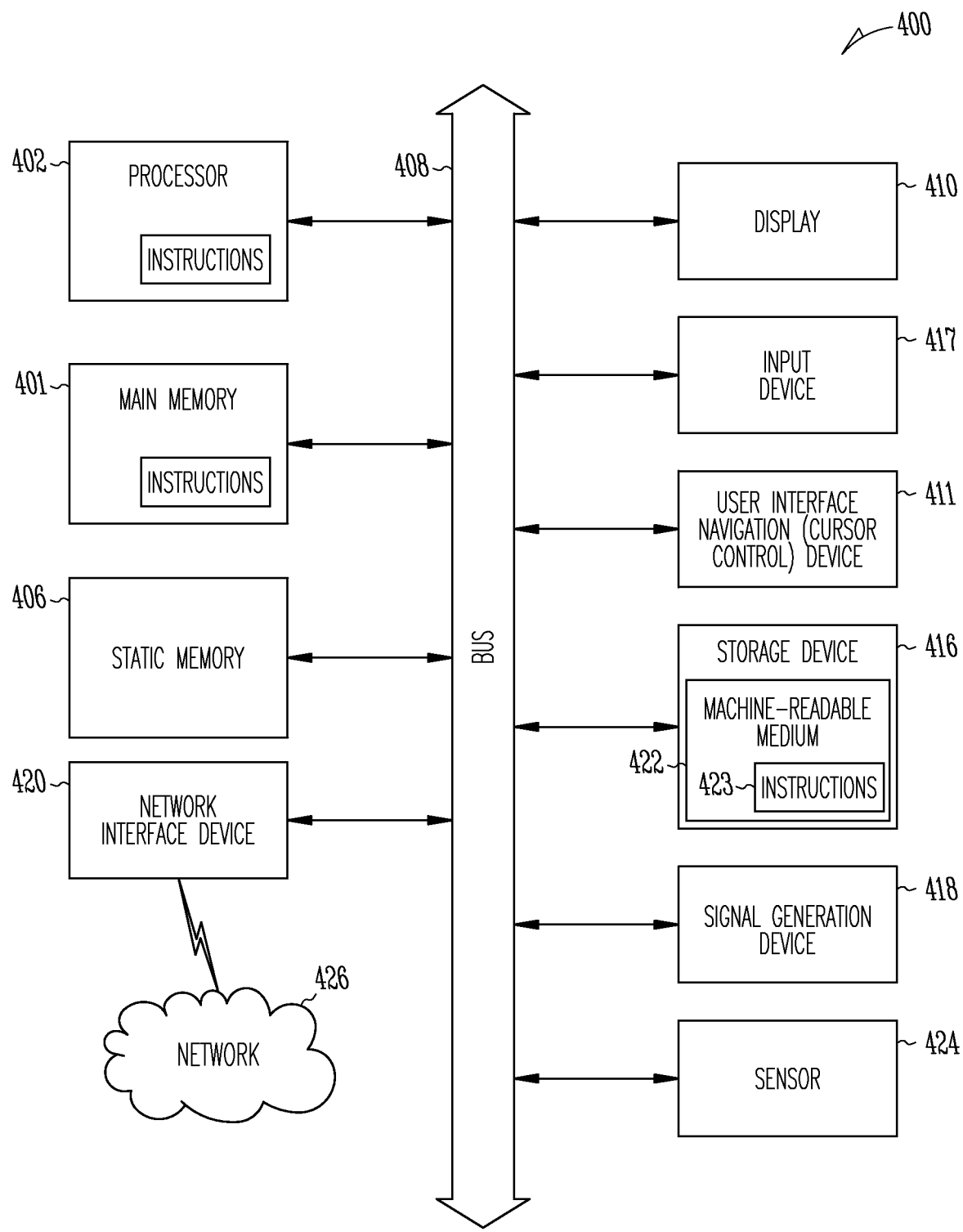
FIG. 4 is a diagram of a computer system upon which one or more of the embodiments disclosed herein can execute.

FIG. 4 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 401 and a static memory 406, which communicate with each other via a bus 408. The computer system 400 may further include a display unit 410, an alphanumeric input device 417 (e.g., a keyboard), and a user interface (UI) navigation device 411 (e.g., a mouse). In one embodiment, the display, input device and cursor control device are a touch screen display. The computer system 400 may additionally include a storage device 416 (e.g., drive unit), a signal generation device 418 (e.g., a speaker), a network interface device 420, and one or more sensors 424, such as a global positioning system sensor, compass, accelerometer, or other sensor.

The drive unit 416 includes a machine-readable medium 422 on which is stored one or more sets of instructions and data structures (e.g., software 423) embodying or utilized by any one or more of the methodologies or functions described herein. The software 423 may also reside, completely or at least partially, within the main memory 401 and/or within the processor 402 during execution thereof by the computer system 400, the main memory 401 and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 423 may further be transmitted or received over a communications network 426 using a transmission medium via the network interface device 420 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 includes a process including receiving into a computer device data relating to a focus of attention of a first attendee in a virtual conference; determining the focus of attention of the first attendee as a function of the data; and modifying one or more of an audio output and a video output of the computer device as a function of the focus of attention of the first attendee.

Example No. 2 includes all the features of Example No. 1, and further optionally includes wherein eye tracking software executes the determining the focus of attention.

Example No. 3 includes all the features of Example Nos. 1-2, and further optionally includes wherein the eye tracking software determines the focus of attention of the first attendee as a function of a length of time of a gaze of the first attendee at a particular area of the computer device.

Example No. 4 includes all the features of Example Nos. 1-3, and further optionally includes wherein the determining the focus of attention of the first attendee is executed by determining that the first attendee is gazing at a second attendee displayed on the computer device and determining that the second attendee is gazing at the first attendee displayed on a second computer device associated with the second attendee.

Example No. 5 includes all the features of Example Nos. 1-4, and further optionally includes wherein the determining the focus of the first attendee is further executed via one or more of an historical analysis and a machine learning analysis.

Example No. 6 includes all the features of Example Nos. 1-5, and further optionally includes wherein the determining the focus of the first attendee is further executed using computer vision.

Example No. 7 includes all the features of Example Nos. 1-6, and further optionally includes wherein the determining the focus of the first attendee is executed via one or more of an historical analysis and a machine learning analysis.

Example No. 8 includes all the features of Example Nos. 1-7, and further optionally includes wherein the determining the focus of the first attendee is further executed using computer vision.

Example No. 9 includes all the features of Example Nos. 1-8, and further optionally includes wherein the modifying the audio output comprises raising a level of the audio output of the first attendee on a computer device of a second attendee.

Example No. 10 includes all the features of Example Nos. 1-9, and further optionally includes wherein modifying the video output comprises modifying a size of the video output of the first attendee on a computer device of a second attendee.

Example No. 11 includes all the features of Example Nos. 1-10, and further optionally includes wherein modifying the video output comprises modifying a quality of the video output of attendees other than the first attendee on a computer device of a second attendee.

Example No. 12 includes all the features of Example Nos. 1-11, and further optionally includes wherein modifying the video output comprises pausing a video output of attendees other than the first attendee on a computer device of a second attendee.

Example No. 13 includes all the features of Example Nos. 1-12, and further optionally includes wherein the modifying the one or more of the audio output and the video output of the computer device is executed in association with a panel discussion in the virtual conference.

Example No. 14 includes all the features of Example Nos. 1-13, and further optionally includes analyzing audio data associated with the virtual conference using a natural language processing algorithm; extracting keywords from the audio data; and modifying the one or more of the audio output and the video output of the computer device as a function of the keywords.

Example No. 15 includes all the features of Example Nos. 1-14, and further optionally includes wherein the modifying the video output of the computer device comprises blurring the video output that is adjacent to the video output of a second attendee, and pausing the video output that is not adjacent to the video output of the second attendee.

Example No. 16 includes a non-transitory machine-readable medium comprising instructions that when executed by a processor executes a process comprising receiving into a computer device data relating to a focus of attention of a first attendee in a virtual conference; determining the focus of attention of the first attendee as a function of the data; and modifying one or more of an audio output and a video output of the computer device as a function of the focus of attention of the first attendee.

Example No. 17 includes all the features of Example No. 16, and further optionally includes wherein eye tracking software executes the determining the focus of attention.

Example No. 18 includes all the features of Example Nos. 16-17, and further optionally includes wherein the determining the focus of attention of the first attendee is executed by determining that the first attendee is gazing at a second attendee displayed on the computer device and determining that the second attendee is gazing at the first attendee displayed on a second computer device associated with the second attendee; and wherein the determining the focus of the first attendee is further executed via one or more of an historical analysis and a machine learning analysis.

Example No. 19 includes all the features of Example Nos. 16-18, and further optionally includes instructions for analyzing audio data associated with the virtual conference using a natural language processing algorithm; extracting keywords from the audio data; and modifying the one or more of the audio output and the video output of the computer device as a function of the keywords.

Example No. 20 includes system having a computer processor and a computer memory coupled to the computer processor; wherein one or more of the computer processor and the computer memory are operable for receiving into a computer device data relating to a focus of attention of a first attendee in a virtual conference; determining the focus of attention of the first attendee as a function of the data; and modifying one or more of an audio output and a video output of the computer device as a function of the focus of attention of the first attendee.

The invention claimed is:

1. A process comprising:
receiving into a computer device data relating to a focus of attention of a first attendee in a virtual conference;
determining the focus of attention of the first attendee as a function of the data; and
modifying one or more of an audio output and a video output of the computer device as a function of the focus of attention of the first attendee;
wherein the modifying the video output of the computer device comprises blurring the video output that is adjacent to the video output of a second attendee, and pausing the video output that is not adjacent to the video output of the second attendee.

2. The process of claim 1, wherein eye tracking software executes the determining the focus of attention.

3. The process of claim 2, wherein the eye tracking software determines the focus of attention of the first attendee as a function of a length of time of a gaze of the first attendee at a particular area of the computer device.

4. The process of claim 2, wherein the determining the focus of attention of the first attendee is executed by determining that the first attendee is gazing at a second attendee displayed on the computer device and determining that the second attendee is gazing at the first attendee displayed on a second computer device associated with the second attendee.

5. The process of claim 2, wherein the determining the focus of the first attendee is further executed via one or more of an historical analysis and a machine learning analysis.

6. The process of claim 2, wherein the determining the focus of the first attendee is further executed using computer vision.

7. The process of claim 1, wherein the determining the focus of the first attendee is executed via one or more of an historical analysis and a machine learning analysis.

8. The process of claim 1, wherein the determining the focus of the first attendee is further executed using computer vision.

9. The process of claim 1, wherein the modifying the audio output comprises raising a level of the audio output of the first attendee on a computer device of a second attendee.

10. The process of claim 1, wherein modifying the video output comprises modifying a size of the video output of the first attendee on a computer device of a second attendee.

11. The process of claim 1, wherein modifying the video output comprises modifying a quality of the video output of attendees other than the first attendee on a computer device of a second attendee.

12. The process of claim 1, wherein modifying the video output comprises pausing a video output of attendees other than the first attendee on a computer device of a second attendee.

13. The process of claim 1, wherein the modifying the one or more of the audio output and the video output of the computer device is executed in association with a panel discussion in the virtual conference.

14. The process of claim 1, comprising:
analyzing audio data associated with the virtual conference using a natural language processing algorithm;
extracting keywords from the audio data; and
modifying the one or more of the audio output and the video output of the computer device as a function of the keywords.

15. A non-transitory machine-readable medium comprising instructions that when executed by a processor executes a process comprising:
receiving into a computer device data relating to a focus of attention of a first attendee in a virtual conference;
determining the focus of attention of the first attendee as a function of the data; and
modifying one or more of an audio output and a video output of the computer device as a function of the focus of attention of the first attendee;
wherein the modifying the video output of the computer device comprises blurting the video output that is adjacent to the video output of a second attendee, and pausing the video output that is not adjacent to the video output of the second attendee.

16. The non-transitory machine-readable medium of claim 15, wherein eye tracking software executes the determining the focus of attention.

17. The non-transitory machine-readable medium of claim 16,
wherein the determining the focus of attention of the first attendee is executed by determining that the first attendee is gazing at a second attendee displayed on the computer device and determining that the second attendee is gazing at the first attendee displayed on a second computer device associated with the second attendee; and
wherein the determining the focus of the first attendee is further executed via one or more of an historical analysis and a machine learning analysis.

18. The non-transitory machine-readable medium of claim 15, comprising instructions for:
analyzing audio data associated with the virtual conference using a natural language processing algorithm;
extracting keywords from the audio data; and
modifying the one or more of the audio output and the video output of the computer device as a function of the keywords.

19. A system comprising:
a computer processor; and a computer memory coupled to the computer processor: wherein one or more of the computer processor and the computer memory are operable for:
receiving into a computer device data relating to a focus of attention of a first attendee in a virtual conference; determining the focus of attention of the first attendee as a function of the data; and modifying one or more of an audio output and a video output of the computer device as a function of the focus of attention of the first attendee; wherein the modifying the video output of the computer device comprises blurring the video output that is adjacent to the video output of a second attendee, and pausing the video output that is not adjacent to the video output of the second attendee.

* * * * *